(12) United States Patent  
Hayashi

(10) Patent No.: US 8,851,758 B2  
(45) Date of Patent: Oct. 7, 2014

(54) BEARING DEVICE

(75) Inventor: Yuichiro Hayashi, Yao (JP)

(73) Assignee: JTEKT Corporation, Osaka-shi (JP)

( * ) Notice: Subject to any disclaimer, the term of this patent is extended or adjusted under 35 U.S.C. 154(b) by 453 days.

(21) Appl. No.: 12/965,088

(22) Filed: Dec. 10, 2010

(65) Prior Publication Data

US 2011/0150379 A1     Jun. 23, 2011

(30) Foreign Application Priority Data

Dec. 17, 2009    (JP) ................................ 2009-286542  
Sep. 28, 2010    (JP) ................................ 2010-217017

(51) Int. Cl.
     *F16C 19/00*      (2006.01)  
     *F16C 33/66*      (2006.01)  
     *F16N 11/00*      (2006.01)

(52) U.S. Cl.
CPC ........... *F16C 33/667* (2013.01); *F16C 33/6625* (2013.01); *F16N 2210/14* (2013.01); *F16C 33/6607* (2013.01); *F16N 11/00* (2013.01)  
USPC .......................................... 384/473; 384/475

(58) Field of Classification Search
CPC ............. F16C 33/6659; F16C 33/6666; F16C 33/6681; F16C 33/6637; F16C 33/664; F16C 33/6655; F16C 33/6651; F16C 33/6607; F16C 33/6622; F16C 33/6625  
USPC ......... 384/468, 471–473, 380, 384, 385, 388, 384/392, 395, 399, 462, 463, 466; 184/1.5, 184/45.1, 81  
See application file for complete search history.

(56) References Cited

U.S. PATENT DOCUMENTS

| | | | |
|---|---|---|---|
| 3,741,344 A | | 6/1973 | Kohl et al. |
| 3,822,002 A | * | 7/1974 | Reedy .......................... 184/45.1 |
| 5,020,636 A | | 6/1991 | Daeges |
| 7,909,513 B2 | * | 3/2011 | Ueno et al. ..................... 384/470 |
| 8,083,469 B1 | * | 12/2011 | Pinera ........................... 415/113 |

(Continued)

FOREIGN PATENT DOCUMENTS

| | | |
|---|---|---|
| DE | 10 2007 049 674 A1 | 4/2009 |
| EP | 1 770 295 A2 | 4/2007 |

(Continued)

OTHER PUBLICATIONS

Machine translation of DE102007049674.*

(Continued)

*Primary Examiner* — Marcus Charles  
*Assistant Examiner* — Yamilka Pinero Medina  
(74) *Attorney, Agent, or Firm* — Oliff PLC

(57) ABSTRACT

A bearing device includes: an outer ring having an outer ring raceway groove on its inner circumferential surface; an inner ring having an inner ring raceway groove on its outer circumferential surface; balls arranged between the outer and inner ring raceway grooves; a retainer retaining the balls; and a liquid lubricant supply device supplying oil content of grease to the space between the inner circumferential surface of the outer ring and the outer circumferential surface of the inner ring. The liquid lubricant supply device includes a liquid lubricant passage providing fluid communication between the inner circumferential surface and the outer circumferential surface; and a vibrating device contacting the grease to vibrate the grease to supply a liquid lubricant to the space between the inner circumferential surface and the outer circumferential surface via the liquid lubricant passage.

1 Claim, 7 Drawing Sheets

(56) References Cited

U.S. PATENT DOCUMENTS

| | | | |
|---|---|---|---|
| 2002/0020460 A1* | 2/2002 | Viken | 141/59 |
| 2002/0102040 A1 | 8/2002 | Koiwa et al. | |
| 2004/0213494 A1* | 10/2004 | Shimomura | 384/473 |
| 2005/0141796 A1* | 6/2005 | Katsuzawa et al. | 384/473 |
| 2008/0008411 A1* | 1/2008 | Hayashi | 384/463 |
| 2009/0034892 A1 | 2/2009 | Akamatsu et al. | |
| 2011/0206306 A1* | 8/2011 | Urano | 384/473 |

FOREIGN PATENT DOCUMENTS

| | | | | |
|---|---|---|---|---|
| GB | 1116286 A | | 6/1968 | |
| JP | A-7-103228 | | 4/1995 | |
| JP | A-2002-130303 | | 5/2002 | |
| JP | A-2006-112457 | | 4/2006 | |
| JP | A-2006-132765 | | 5/2006 | |
| JP | 2007-64139 | * | 3/2007 | F04D 29/04 |
| JP | A-2007-224934 | | 9/2007 | |
| WO | WO 2010010897 A1 | * | 1/2010 | F16C 33/58 |

OTHER PUBLICATIONS

Machine translation of JP2007-64139.*
Feb. 16, 2012 Office Action issued in European Patent Application No. 10195364.4.
Extended European Search Report issued in European Patent Application No. 10195364.4 dated Apr. 6, 2011.
Feb. 12, 2014 Office Action issued in Japanese Patent Application No. 2010-217017 (with English Translation).

* cited by examiner

BEARING DEVICE

INCORPORATION BY REFERENCE

The disclosure of Japanese Patent Applications No. 2009-286542 filed on Dec. 17, 2009 and No. 2010-217017 filed on Sep. 28, 2010, including the specifications, drawings and abstracts, is incorporated herein by reference in its entirety.

BACKGROUND OF THE INVENTION

1. Field of the Invention

The invention relates to a bearing device that supports, for example, a main shaft of a machine tool that rotates at a high speed.

2. Description of the Related Art

A typical mode of lubrication for a bearing includes grease lubrication and oil lubrication. A bearing device that provides the oil lubrication is described in Japanese Patent Application Publication No. 2002-130303 (JP-A-2002-130303).

More specifically, the bearing device transfers lubricating oil from an outside into a ball bearing by compressed air to lubricate raceway surfaces and balls of the ball bearing. In such lubrication, lubricating oil having a relatively low temperature is supplied from an outside to actively cool the ball bearing from an inside thereof. By so doing, it is possible to form a sufficient lubricating oil film inside the ball bearing.

However, in the bearing device according to the related art, because lubricating oil is transferred from an outside into the ball bearing by compressed air, there is a problem that lubricating oil splashes around the ball bearing to deteriorate its usage environment.

On the other hand, the grease lubrication lubricates a raceway surface, and the like, with grease sealed in the bearing, so that the above problem does not occur; however, there is another problem that the agitation resistance of grease lubrication is larger than that of oil lubrication to cause a large increase in temperature, and the service life of grease is relatively short, so that periodic maintenance is required. Therefore, it is difficult to use grease lubrication for a bearing of a machine tool that rotates at a high speed.

SUMMARY OF INVENTION

An object of the invention is to provide a bearing device, with which it is possible to reduce a load on a usage environment, and that has a small agitation resistance, a long service life, and a maintenance-free property.

A bearing device includes: an outer ring that has a raceway surface on the inner circumferential surface of the outer ring; an inner ring that has a raceway surface on the outer circumferential surface of the inner ring; a plurality of rolling elements that are arranged between the raceway surface of the outer ring and the raceway surface of the inner ring; a retainer that retains the plurality of rolling elements; and a liquid lubricant supply device that supplies a liquid lubricant to the space between the inner circumferential surface of the outer ring and the outer circumferential surface of the inner ring, wherein the liquid lubricant supply device includes a liquid lubricant passage that provides fluid communication between the inner circumferential surface of the outer ring and the outer circumferential surface of the inner ring and a vibrating device that contacts a non-liquid lubricant that is a solid, semisolid or viscous lubricant or a lubricant-containing resin composition to vibrate the non-liquid lubricant in order to supply the liquid lubricant to the space between the inner circumferential surface of the outer ring and the outer circumferential surface of the inner ring via the liquid lubricant passage.

According to the above bearing device, the vibrating device contacts a non-liquid lubricant that is a solid, semisolid or viscous lubricant or a lubricant-containing resin composition and vibrates the non-liquid lubricant in order to supply a liquid lubricant to the space between the inner circumferential surface of the outer ring and the outer circumferential surface of the inner ring via the liquid lubricant passage that provides fluid communication between the inner circumferential surface of the outer ring and the outer circumferential surface of the inner ring, so that it is possible to separate oil content from the non-liquid lubricant and transfer the oil content to the space between the inner circumferential surface of the outer ring and the outer circumferential surface of the inner ring via the liquid lubricant passage.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Hereinafter, bearing devices according to embodiments of the invention will be described in detail with reference to the accompanying drawings.

Figure 1:
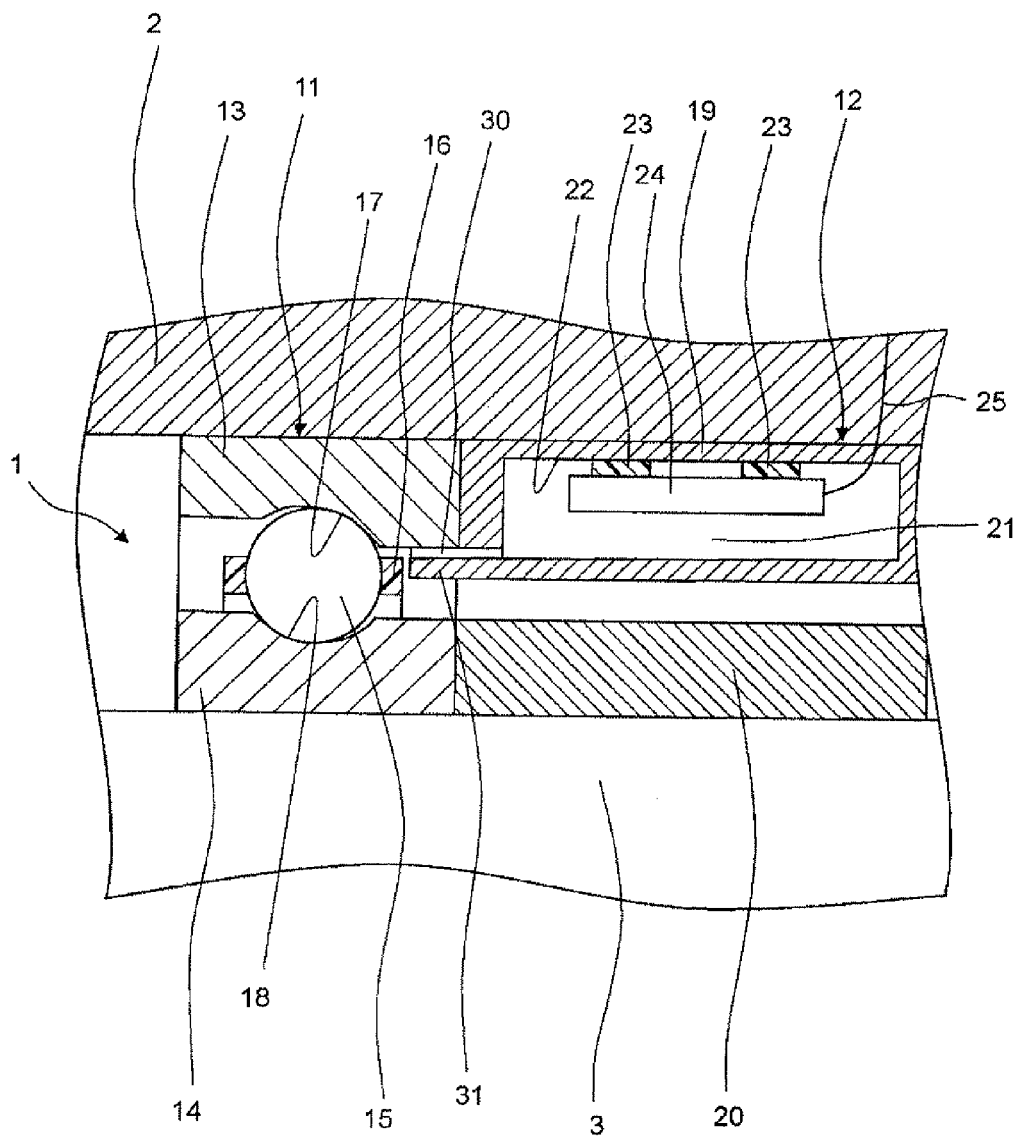
FIG. 1 is a schematic sectional view of a bearing device according to a first embodiment of the invention, taken along the axis.

First, a first embodiment of the invention will be described. FIG. 1 is a schematic sectional view taken along a plane including a rotation axis of a bearing device 1 according to the first embodiment of the invention. Note that the bearing device 1 is used for a machine tool in the first embodiment.

The bearing device 1 is assembled to a housing 2 that is on a stationary side of the machine tool, and supports a main shaft 3 that is on a rotating side of the machine tool. The bearing device 1 includes a single row angular contact ball bearing 11 and a liquid lubricant supply device 12. The liquid lubricant supply device 12 supplies oil content of grease 21 into the single row angular contact ball bearing 11. Note that the grease 21 is an example of a non-liquid lubricant, and the oil content of the grease 21 is an example of a liquid lubricant.

The single row angular contact ball bearing 11 includes an outer ring 13, an inner ring 14, a plurality of balls 15 (only one of them is shown in FIG. 1), and a retainer 16. Note that the balls 15 are an example of rolling elements.

The outer ring 13 is fitted into the housing 2 of the machine tool. The inner circumferential surface of the outer ring 13 has an outer ring raceway groove 17 having a circular arc shape in cross section. Note that the outer ring raceway groove 17 is an example of a raceway surface of the outer ring.

The inner ring 14 is fitted onto the outer circumferential surface of the main shaft 3 of the machine tool, and rotates synchronously with the main shaft 3. In addition, the outer circumferential surface of the inner ring 14 has an inner ring raceway groove 18 having a circular arc shape in cross section. Note that the inner ring raceway groove 18 is an example of a raceway surface of the inner ring.

The plurality of balls 15 are arranged between the outer ring raceway groove 17 and the inner ring raceway groove 18, and roll on the outer ring raceway groove 17 and the inner ring raceway groove 18.

Although not shown in the drawing, the retainer 16 has a plurality of pockets that are formed at predetermined intervals in the circumferential direction. Each pocket holds one ball 15.

The liquid lubricant supply device 12 includes an annular outer spacer 19, an annular inner spacer 20, a liquid lubricant passage 30, and a vibrating device 24. The outer spacer 19 is fitted into the inner circumferential surface of the housing 2 of the machine tool. The inner spacer 20 is fitted onto the outer circumferential surface of the main shaft 3 of the machine tool. The liquid lubricant passage 30 provides fluid communication between the inner circumferential surface of the outer ring 13 and the outer circumferential surface of the inner ring 14. The vibration device 24 is used to supply oil content of the grease 21 to between the inner circumferential surface of the outer ring 13 and the outer circumferential surface of the inner ring 14.

The outer spacer 19 has a grease storage portion 22 that stores the grease 21. The space inside the grease storage portion 22 communicates with the space between the inner circumferential surface of the outer ring 13 and the outer circumferential surface of the inner ring 14 via the liquid lubricant passage 30. Then, the vibrating device 24 is assembled to the inner circumferential surface of the grease storage portion 22 via rubber members 23. That is, the vibrating device 24 is arranged inside the grease storage portion 22. Note that the grease storage portion 22 is an example of a non-liquid lubricant storage portion.

The vibrating device 24 vibrates the grease 21 in the grease storage portion 22. Specific examples of such a vibrating device 24 include, for example, an ultrasonic generator, a vibrator equipped for a cellular phone, or the like. In addition, the vibrating device 24 is connected to a control device 27 (described later) via a connection line 25. Note that the vibrating device 24 may be equipped with a battery or may be equipped with no battery and supplied with electric power from the outside of the outer spacer 19.

The grease 21 is a lubricating grease composition that includes a base oil, such as synthetic hydrocarbon oil, and a thickener, such as lithium soap. The lubricating grease composition may be blended with an additive, such as an oxidation inhibitor, an extreme pressure additive, an anti-wear agent, a rust preventive agent, a corrosion inhibitor, a structure stabilizer, and a solid lubricant.

In addition, a protruding portion 31 that protrudes in the axial direction is formed at an inner edge portion of an outer ring 13—side axial end surface of the outer spacer 19. The protruding portion 31 is inserted between the inner circumferential surface of the outer ring 13 and the outer circumferential surface of the inner ring 14. Part of the liquid lubricant passage 30 is formed on an outer ring 13—side surface of the protruding portion 31. The base oil of the grease 21 passes through the liquid lubricant passage 30 and seeps into the angular contact ball bearing 11 because of capillarity. An end of the liquid lubricant passage 30 on the side closer to the angular contact ball bearing 11 is located near the outer ring raceway groove 17, the inner ring raceway groove 18, and the balls 15.

Figure 2:
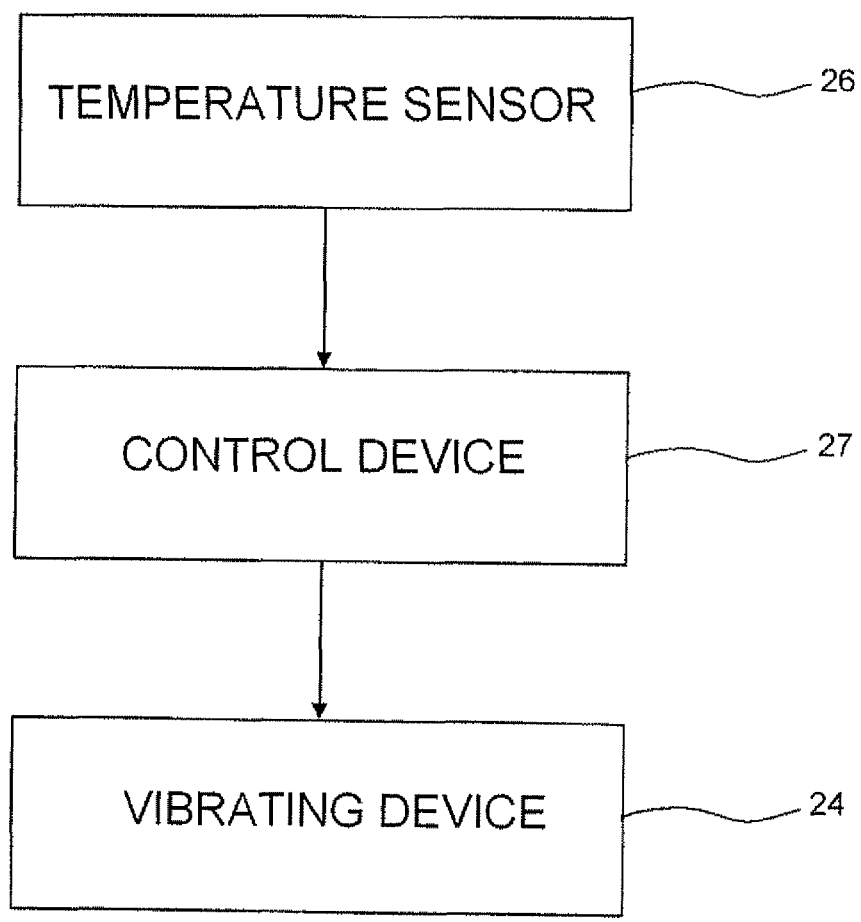
FIG. 2 is a control block diagram of the bearing device according to first and second embodiments of the invention.

FIG. 2 is a control block diagram of the bearing device 1.

The bearing device 1 includes a temperature sensor 26 and a control device 27. The temperature sensor 26 detects the temperature of at least one of the outer ring 13 and the inner ring 14. The control device 27 controls the on/off states of the vibrating device 24 based on the temperature detected by the temperature sensor 26. The temperature sensor 26 may be either a contact type or a non-contact type.

The control device 27 controls the vibrating device 24 so that the vibration duration (on time), frequency, or amplitude of the vibrating device 24 when the temperature detected by the temperature sensor 26 is a first temperature differs from the vibration duration, frequency, or amplitude of the vibrating device 24 when the temperature detected by the temperature sensor 26 is a second temperature. Here, the first temperature and the second temperature are preset temperatures, and the first temperature differs from the second temperature.

With the above configured bearing device 1, the vibrating device 24 vibrates the grease 21 to separate base oil from the grease 21. The base oil passes through the liquid lubricant passage 30 and enters between the inner circumferential surface of the outer ring 13 and the outer circumferential surface of the inner ring 14 and then adheres to an outer spacer 19—side portion of the outer ring raceway groove 17. By so doing, the outer ring raceway groove 17, the inner ring raceway groove 18, and the balls 15 are lubricated by the base oil.

In this way, because compressed air is not used to transfer the base oil, oil does not splash unlike the configuration described in JP-A-2002-130303, so that it is possible to prevent deterioration of an environment in which the machine tool is used.

In addition, the outer ring raceway groove 17, the inner ring raceway groove 18, and the balls 15 are lubricated by base oil, so that the agitation resistance is reduced, the service life is extended, and a maintenance-free property is achieved.

In addition, separation of base oil from the grease 21 is facilitated by the vibrations of the vibrating device 24, so that the amount of base oil that enters between the inner circumferential surface of the outer ring 13 and the outer circumferential surface of the inner ring 14 is increased to thereby make it possible to carry out lubrication that is equivalent in performance to oil lubrication.

In addition, because the outer spacer 19 has the grease storage portion 22 that stores the grease 21, the number of times the grease 21 is refilled is reduced, so that it is possible to further improve maintainability.

In addition, because the end of the liquid lubricant passage 30 on the side closer to the angular contact ball bearing 11 is located near the outer ring raceway groove 17, the inner ring raceway groove 18, and the balls 15, it is possible to efficiently supply base oil to the outer ring raceway groove 17, the inner ring raceway groove 18, and the balls 15.

In addition, because the vibrating device 24 is arranged inside the grease storage portion 22, it is possible to reduce the size of the liquid lubricant supply device 12.

In addition, because the vibration duration, frequency, or amplitude of the vibrating device 24 when the temperature detected by the temperature sensor 26 is a first temperature differs from the vibration duration, frequency, or amplitude of the vibrating device 24 when the temperature detected by the temperature sensor 26 is a second temperature that is different from the first temperature, it is possible to adjust the amount of base oil that enters between the inner circumferential surface of the outer ring 13 and the outer circumferential surface of the inner ring 14 according to the temperature detected by the temperature sensor 26. For example, it is possible to relatively reduce the amount of base oil that enters between the inner circumferential surface of the outer ring 13 and the outer circumferential surface of the inner ring 14 when the temperature detected by the temperature sensor 26 is relatively low; and on the other hand, it is possible to relatively increase the amount of base oil that enters between the inner circumferential surface of the outer ring 13 and the outer circumferential surface of the inner ring 14 when the temperature detected by the temperature sensor 26 is relatively high. By so doing, it is possible to effectively suppress an increase in temperature when the angular contact ball bearing 11 rotates at a high speed.

In addition, because the bearing device 1 includes the liquid lubricant supply device 12, a device like the air and lubricating oil supply source described in JP-A-2002-130303 is not required, so that it is possible to reduce an investment in equipment.

In addition, the liquid lubricant supply device 12 does not transfer lubricating oil with compressed air, so that no wind noise due to compressed air occurs.

Figure 3:
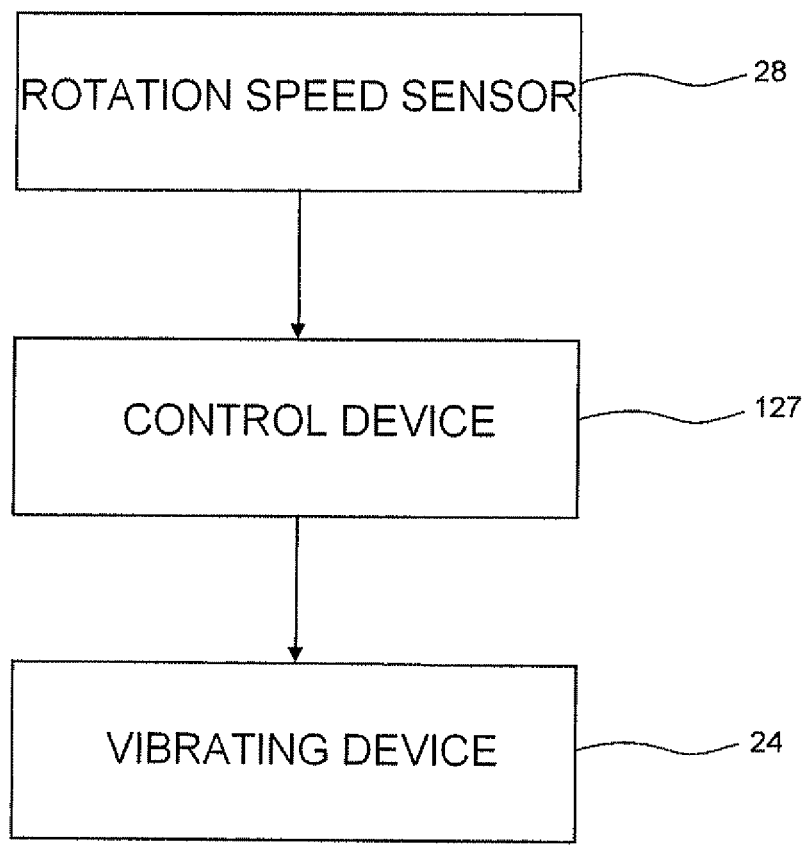
FIG. 3 is a control block diagram of the bearing device according to a modification of the first and second embodiments of the invention.

In the first embodiment, as shown in FIG. 3, a rotation speed sensor 28 and a control device 127 may be used. The rotation speed sensor 28 detects the rotation speed of the outer ring 13 or the rotation speed of the inner ring 14. The control device 127 controls the vibrating device 24 based on the rotation speed detected by the rotation speed sensor 28.

The control device 127 controls the vibrating device 24 so that the vibration duration, frequency, or amplitude of the vibrating device 24 when the rotation speed detected by the rotation speed sensor 28 is a first rotation speed differs from the vibration duration, frequency, or amplitude of the vibrating device 24 when the rotation speed detected by the rotation speed sensor 28 is a second rotation speed. Here, the first rotation speed and the second rotation speed are preset rotation speeds, and the first rotation speed differs from the second rotation speed.

The above rotation speed sensor 28 and the control device 127 are used to thereby make it possible to adjust the amount of base oil that enters between the inner circumferential surface of the outer ring 13 and the outer circumferential surface of the inner ring 14 according to the rotation speed detected by the rotation speed sensor 28. For example, it is possible to relatively reduce the amount of base oil that enters between the inner circumferential surface of the outer ring 13 and the outer circumferential surface of the inner ring 14 when the rotation speed detected by the rotation speed sensor 28 is relatively low; and on the other hand, it is possible to relatively increase the amount of oil that enters between the inner circumferential surface of the outer ring 13 and the outer circumferential surface of the inner ring 14 when the rotation speed detected by the rotation speed sensor 28 is relatively high. By so doing, it is possible to effectively suppress an increase in temperature when the angular contact ball bearing 11 rotates at a high speed.

In addition, the control device 27 or 127 may be arranged inside the grease storage portion 22 or may be arranged outside the grease storage portion 22.

In the first embodiment, the bearing device 1 includes the single row angular contact ball bearing 11; instead, the bearing device 1 may include a double row angular contact ball bearing or may include, for example, a cylindrical roller bearing, a conical roller bearing, or the like, other than the angular contact ball bearing.

In the first embodiment, the grease 21 is used; however, other than the grease 21, a non-liquid lubricant that is a solid, semisolid, or viscous lubricant or a lubricant-containing resin composition may also be used. The lubricant-containing resin composition may be one obtained by adding oil to polyethylene (PE) for solidification, for example.

Figure 4:
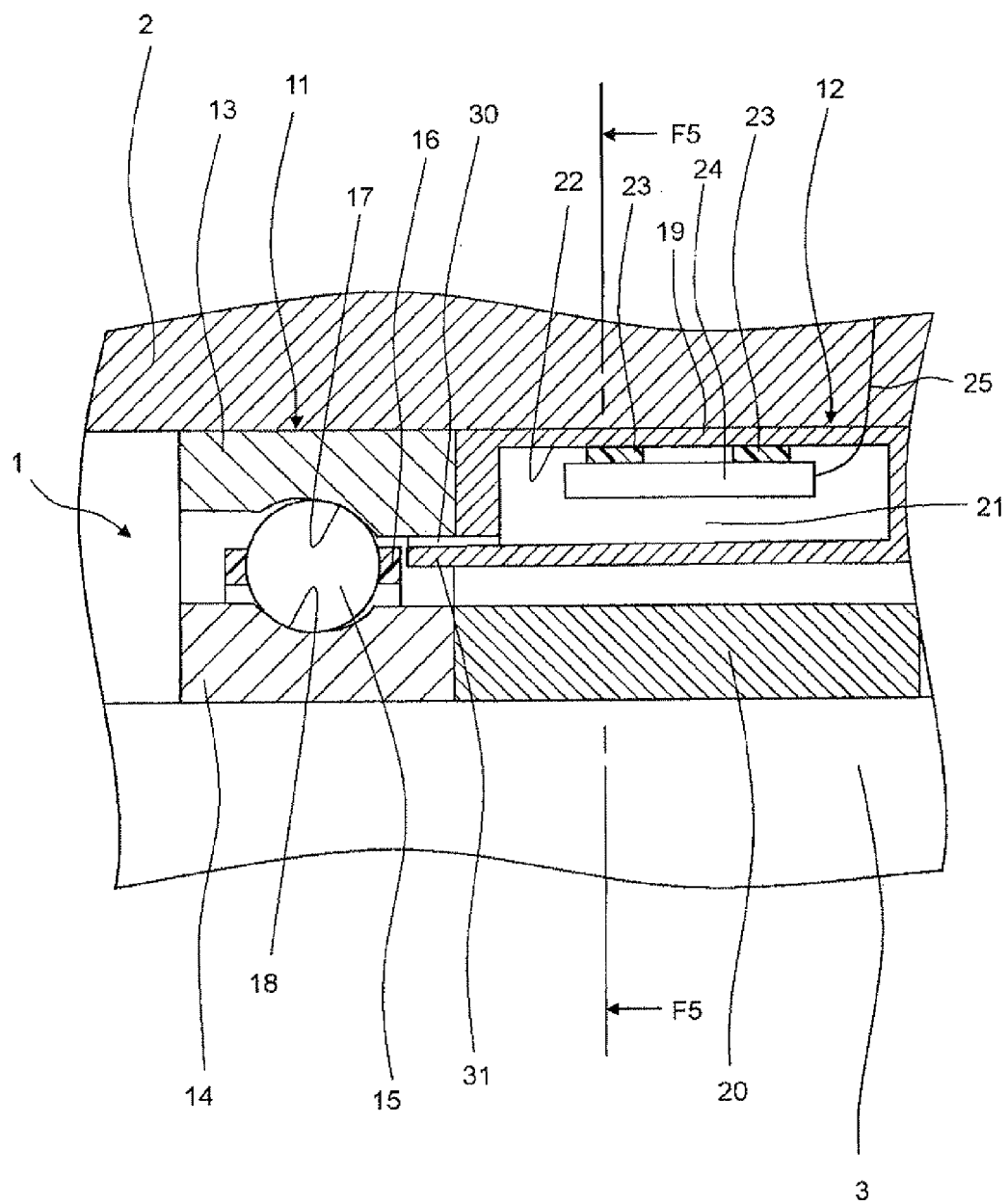
FIG. 4 is a schematic sectional view of a bearing device according to the second embodiment of the invention, taken along the axis.

Next, a second embodiment of the invention will be described. FIG. 4 is a schematic sectional view of the bearing device 1 according to the second embodiment of the invention, the sectional view being taken along a plane that includes a rotation axis of the bearing device 1. Note that, in the second embodiment, the bearing device 1 is used for a machine tool.

The bearing device 1 is assembled to a housing 2 that is on a stationary side of the machine tool, and supports a main shaft 3 that is on a rotating side of the machine tool. The bearing device 1 includes a single row angular contact ball bearing 11 and a liquid lubricant supply device 12. The liquid lubricant supply device 12 supplies oil content of grease 21 into the single row angular contact ball bearing 11. Note that the grease 21 is an example of a non-liquid lubricant, and the oil content of the grease 21 is an example of a liquid lubricant.

The single row angular contact ball bearing 11 includes an outer ring 13, an inner ring 14, a plurality of balls 15 (only one of them is shown in FIG. 4), and a retainer 16. Note that the balls 15 are an example of rolling elements.

The outer ring 13 is fitted into the housing 2 of the machine tool. The inner circumferential surface of the outer ring 13 has an outer ring raceway groove 17 having a circular arc shape in cross section. Note that the outer ring raceway groove 17 is an example of a raceway surface of the outer ring.

The inner ring 14 is fitted onto the outer circumferential surface of the main shaft 3 of the machine tool, and rotates synchronously with the main shaft 3. In addition, the outer circumferential surface of the inner ring 14 has an inner ring raceway groove 18 having a circular arc shape in cross section. Note that the inner ring raceway groove 18 is an example of a raceway surface of the inner ring.

The plurality of balls 15 are arranged between the outer ring raceway groove 17 and the inner ring raceway groove 18, and roll on the outer ring raceway groove 17 and the inner ring raceway groove 18.

Although not shown in the drawing, the retainer 16 has a plurality of pockets that are formed at predetermined intervals in the circumferential direction. Each pocket holds one ball 15.

The liquid lubricant supply device 12 includes an annular outer spacer 19, a liquid lubricant passage 30, and a vibrating device 24. The outer spacer 19 is fitted into the inner circumferential surface of the housing 2 of the machine tool. The liquid lubricant passage 30 provides fluid communication between the inner circumferential surface of the outer ring 13 and the outer circumferential surface of the inner ring 14. The vibration device 24 is used to supply oil content of the grease 21 to the space between the inner circumferential surface of the outer ring 13 and the outer circumferential surface of the inner ring 14. An annular inner spacer 20 is arranged on a radially inner side of the liquid lubricant supply device 12. The inner spacer 20 is fitted onto the outer circumferential surface of the main shaft 3 of the machine tool.

The outer spacer 19 has a grease storage portion 22 that stores the grease 21. Note that the grease storage portion 22 is an example of a non-liquid lubricant storage portion.

Figure 5:
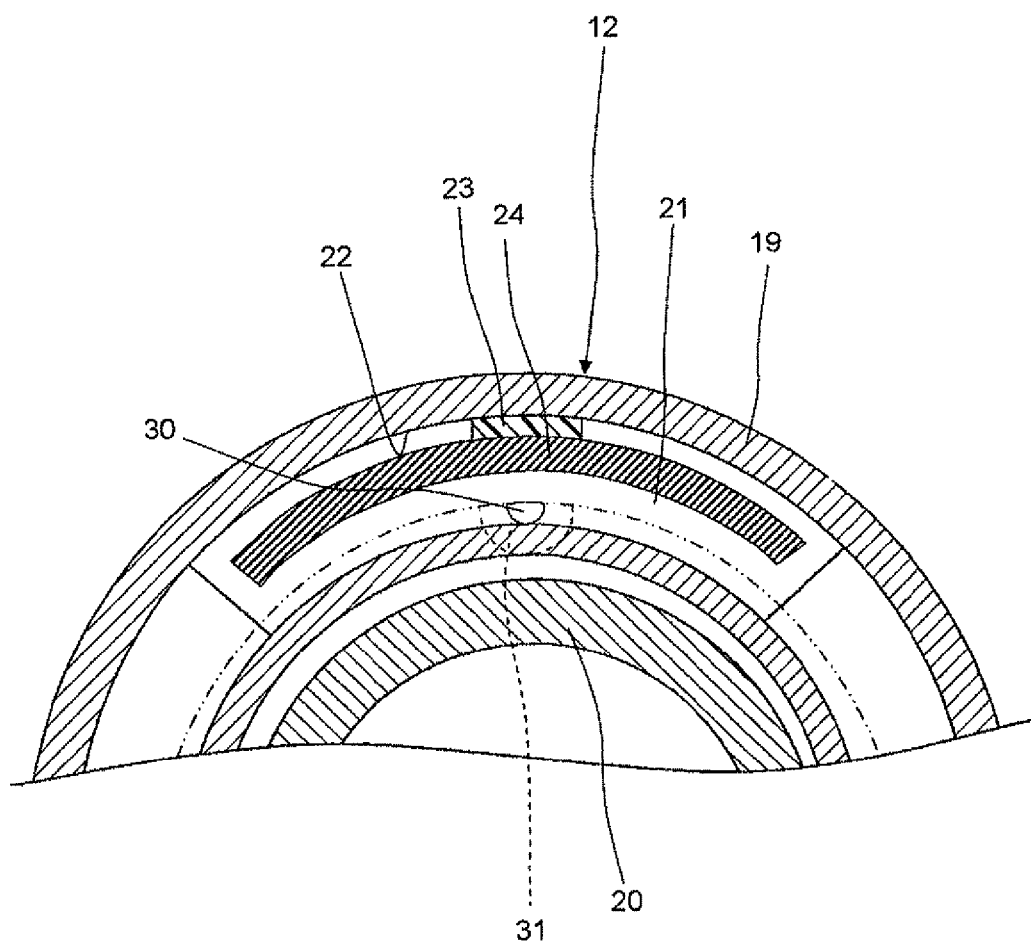
FIG. 5 is a sectional view on arrow F5-F5 in FIG. 4.

FIG. 5 is a sectional view taken along the line F5-F5 in FIG. 4.

As shown in FIG. 4 and FIG. 5, the space inside the grease storage portion 22 is formed in a substantially rectangular shape in cross section taken along the axis of the outer ring 13, and is formed in a substantially circular arc shape in cross section taken perpendicularly to the axis of the outer ring 13. In addition, the space inside the grease storage portion 22 communicates with the space between the inner circumferential surface of the outer ring 13 and the outer circumferential surface of the inner ring 14 via the single liquid lubricant passage 30. Then, the vibrating device 24 is assembled to the inner circumferential surface of the grease storage portion 22 with rubber members 23 interposed therebetween. That is, the vibrating device 24 is arranged inside the grease storage portion 22. The vibrating device 24 is formed in a substantially rectangular shape in cross section taken along the axis of the outer ring 13, and is formed in a substantially circular arc shape in cross section taken perpendicularly to the axis of the outer ring 13. In addition, the vibrating device 24 is assembled to the grease storage portion 22 with the rubber members 23 interposed therebetween so as not to directly contact the grease storage portion 22.

The vibrating device 24 vibrates the grease 21 in the grease storage portion 22. Specific examples of the vibrating device 24 include, for example, an ultrasonic generator, a vibrator equipped for a cellular phone, or the like. In addition, the vibrating device 24 is connected to a control device 27 (described later) via a connection line 25. Note that the vibrating device 24 may be equipped with a battery or may be equipped with no battery and supplied with electric power from the outside of the outer spacer 19.

The grease 21 is a lubricating grease composition that includes a base oil, such as synthetic hydrocarbon oil, and a thickener, such as lithium soap. The lubricating grease composition may be blended with an additive, such as an oxidation inhibitor, an extreme pressure additive, an anti-wear agent, a rust preventive agent, a corrosion inhibitor, a structure stabilizer, and a solid lubricant.

In addition, a protruding portion 31 that protrudes in the axial direction is formed at an inner edge portion of an outer ring 13—side axial end surface of the outer spacer 19. The protruding portion 31 is inserted between the inner circumferential surface of the outer ring 13 and the outer circumferential surface of the inner ring 14. The protruding portion 31 is formed in a shape such that a tube is cut along a plane parallel to an axial direction in which the tube extends, and is welded to an inner circumferential side of the outer spacer 19. The protruding portion 31 has a circular arc shape in cross section perpendicular to the axial direction. In FIG. 5, the chain double-dashed line indicates the position of the inner circumferential surface of a shoulder of the outer ring 13, and the dotted line indicates the shape of the protruding portion 31. Both ends of the circular arc of the protruding portion 31 are in contact with the inner circumferential surface of the shoulder of the outer ring 13. The protruding portion 31 and the shoulder of the outer ring 13 form part of the liquid lubricant passage 30. The remaining portion of the liquid lubricant passage 30 is formed at an outer ring 13—side end of the outer spacer 19. The base oil of the grease 21 passes through the liquid lubricant passage 30 and seeps into the angular contact ball bearing 11 because of capillarity. An end of the liquid lubricant passage 30 on the side closer to the angular contact ball bearing 11 is located near the outer ring raceway groove 17, the inner ring raceway groove 18, and the balls 15.

The control block diagram of the bearing device 1 is FIG. 2 as in the case of the first embodiment, so that the description of the control block diagram will be made with reference to FIG. 2.

The bearing device 1 includes a temperature sensor 26 and a control device 27. The temperature sensor 26 detects the temperature of at least one of the outer ring 13 and the inner ring 14. The control device 27 controls the on/off states of the vibrating device 24 based on the temperature detected by the temperature sensor 26. The temperature sensor 26 may be either a contact type or a non-contact type.

The control device 27 controls the vibrating device 24 so that the vibration duration (on time), frequency, or amplitude of the vibrating device 24 when the temperature detected by the temperature sensor 26 is a first temperature differs from the vibration duration, frequency, or amplitude of the vibrating device 24 when the temperature detected by the temperature sensor 26 is a second temperature. Here, the first temperature and the second temperature are preset temperatures, and the first temperature differs from the second temperature.

With the above configured bearing device 1, the vibrating device 24 vibrates the grease 21 to separate base oil from the grease 21. The base oil passes through the liquid lubricant passage 30 and enters between the inner circumferential surface of the outer ring 13 and the outer circumferential surface of the inner ring 14 and then adheres to an outer spacer 19—side portion of the outer ring raceway groove 17. By so doing, the outer ring raceway groove 17, the inner ring raceway groove 18, and the balls 15 are lubricated by the base oil.

In this way, because compressed air is not used to transfer the base oil, oil does not splash unlike the configuration described in JP-A-2002-130303, so that it is possible to prevent deterioration of an environment in which the machine tool is used.

In addition, the outer ring raceway groove 17, the inner ring raceway groove 18, and the balls 15 are lubricated by base oil, so that the agitation resistance is reduced, the service life is extended, and a maintenance-free property is achieved.

In addition, separation of base oil from the grease 21 is facilitated by the vibrations of the vibrating device 24, so that the amount of base oil that enters between the inner circumferential surface of the outer ring 13 and the outer circumferential surface of the inner ring 14 is increased to thereby make it possible to carry out lubrication that is equivalent in performance to oil lubrication.

In addition, because the outer spacer 19 has the grease storage portion 22 that stores the grease 21, the number of times the grease 21 is refilled is reduced, so that it is possible to further improve maintainability.

In addition, because the end of the liquid lubricant passage 30 on the side closer to the angular contact ball bearing 11 is located near the outer ring raceway groove 17, the inner ring raceway groove 18, and the balls 15, it is possible to efficiently supply base oil to the outer ring raceway groove 17, the inner ring raceway groove 18, and the balls 15.

In addition, because the vibrating device 24 is arranged inside the grease storage portion 22, it is possible to reduce the size of the liquid lubricant supply device 12.

In addition, because the vibration duration, frequency, or amplitude of the vibrating device 24 when the temperature detected by the temperature sensor 26 is a first temperature differs from the vibration duration, frequency, or amplitude of the vibrating device 24 when the temperature detected by the temperature sensor 26 is a second temperature that is different from the first temperature, it is possible to adjust the amount of base oil that enters between the inner circumferential surface of the outer ring 13 and the outer circumferential surface of the inner ring 14 according to the temperature detected by the temperature sensor 26. For example, it is possible to relatively reduce the amount of base oil that enters between the inner circumferential surface of the outer ring 13 and the outer circumferential surface of the inner ring 14 is relatively reduced when the temperature detected by the temperature sensor 26 is relatively low; and on the other hand, it is possible to relatively increase the amount of base oil that enters between the inner circumferential surface of the outer ring 13 and the outer circumferential surface of the inner ring 14 when the temperature detected by the temperature sensor 26 is relatively high. By so doing, it is possible to effectively suppress an increase in temperature when the angular contact ball bearing 11 rotates at a high speed.

In addition, when the bearing device 1 includes the liquid lubricant supply device 12, a device like the air and lubricating oil supply source described in JP-A-2002-130303 is not required, so that it is possible to reduce an investment in equipment.

In addition, the liquid lubricant supply device 12 does not transfer lubricating oil with compressed air, so that no wind noise due to compressed air occurs.

In the second embodiment, as shown in FIG. 3, a rotation speed sensor 28 and a control device 127 may be used. The rotation speed sensor 28 detects the rotation speed of the outer ring 13 or the rotation speed of the inner ring 14. The control device 127 controls the vibrating device 24 based on the rotation speed detected by the rotation speed sensor 28.

The control device 127 controls the vibrating device 24 so that the vibration duration, frequency, or amplitude of the vibrating device 24 when the rotation speed detected by the rotation speed sensor 28 is a first rotation speed differs from the vibration duration, frequency, or amplitude of the vibrating device 24 when the rotation speed detected by the rotation speed sensor 28 is a second rotation speed. Here, the first rotation speed and the second rotation speed are preset rotation speeds, and the first rotation speed differs from the second rotation speed.

The above rotation speed sensor 28 and the control device 127 are used to thereby make it possible to adjust the amount of base oil that enters between the inner circumferential surface of the outer ring 13 and the outer circumferential surface of the inner ring 14 according to the rotation speed detected by the rotation speed sensor 28. For example, it is possible to relatively reduce the amount of base oil that enters between the inner circumferential surface of the outer ring 13 and the outer circumferential surface of the inner ring 14 when the rotation speed detected by the rotation speed sensor 28 is relatively low; and on the other hand, it is possible to relatively increase the amount of oil that enters between the inner circumferential surface of the outer ring 13 and the outer circumferential surface of the inner ring 14 when the rotation speed detected by the rotation speed sensor 28 is relatively high. By so doing, it is possible to effectively suppress an increase in temperature when the angular contact ball bearing 11 rotates at a high speed.

In addition, the control device 27 or 127 may be arranged inside the grease storage portion 22 or may be arranged outside the grease storage portion 22.

In the second embodiment, the bearing device 1 includes the single row angular contact ball bearing 11; instead, the bearing device 1 may include a double row angular contact ball bearing or may include, for example, a cylindrical roller bearing, a conical roller bearing, or the like, other than the angular contact ball bearing.

In the second embodiment, the grease 21 is used; however, other than the grease 21, a non-liquid lubricant that is a solid, semisolid or viscous lubricant or a lubricant-containing resin composition may also be used. The lubricant-containing resin composition may be one obtained by adding oil to polyethylene (PE) for solidification, for example.

In the second embodiment, the space inside the grease storage portion 22 is formed in a substantially circular arc shape in cross section taken perpendicularly to the axis of the outer ring 13; instead, the space inside the grease storage portion 22 may be formed in an annular shape in cross section taken perpendicularly to the axis of the outer ring 13.

In the second embodiment, the outer spacer 19 has the single grease storage portion 22; instead, the outer spacer 19 may have a plurality of the grease storage portions 22 that are formed at predetermined intervals in the circumferential direction. That is, in an embodiment of the invention, the number of non-liquid lubricant storage portions may be either one or multiple.

In the second embodiment, the space inside the single grease storage portion 22 communicates with the space between the inner circumferential surface of the outer ring 13 and the outer circumferential surface of the inner ring 14 via the single liquid lubricant passage 30; instead, the space inside the single grease storage portion 22 may communicate with the space between the inner circumferential surface of the outer ring 13 and the outer circumferential surface of the inner ring 14 via a plurality of the liquid lubricant passages 30. That is, in an embodiment of the invention, the number of liquid lubricant passages that connect with the single non-liquid lubricant storage portion may be either one or multiple.

Figure 6:
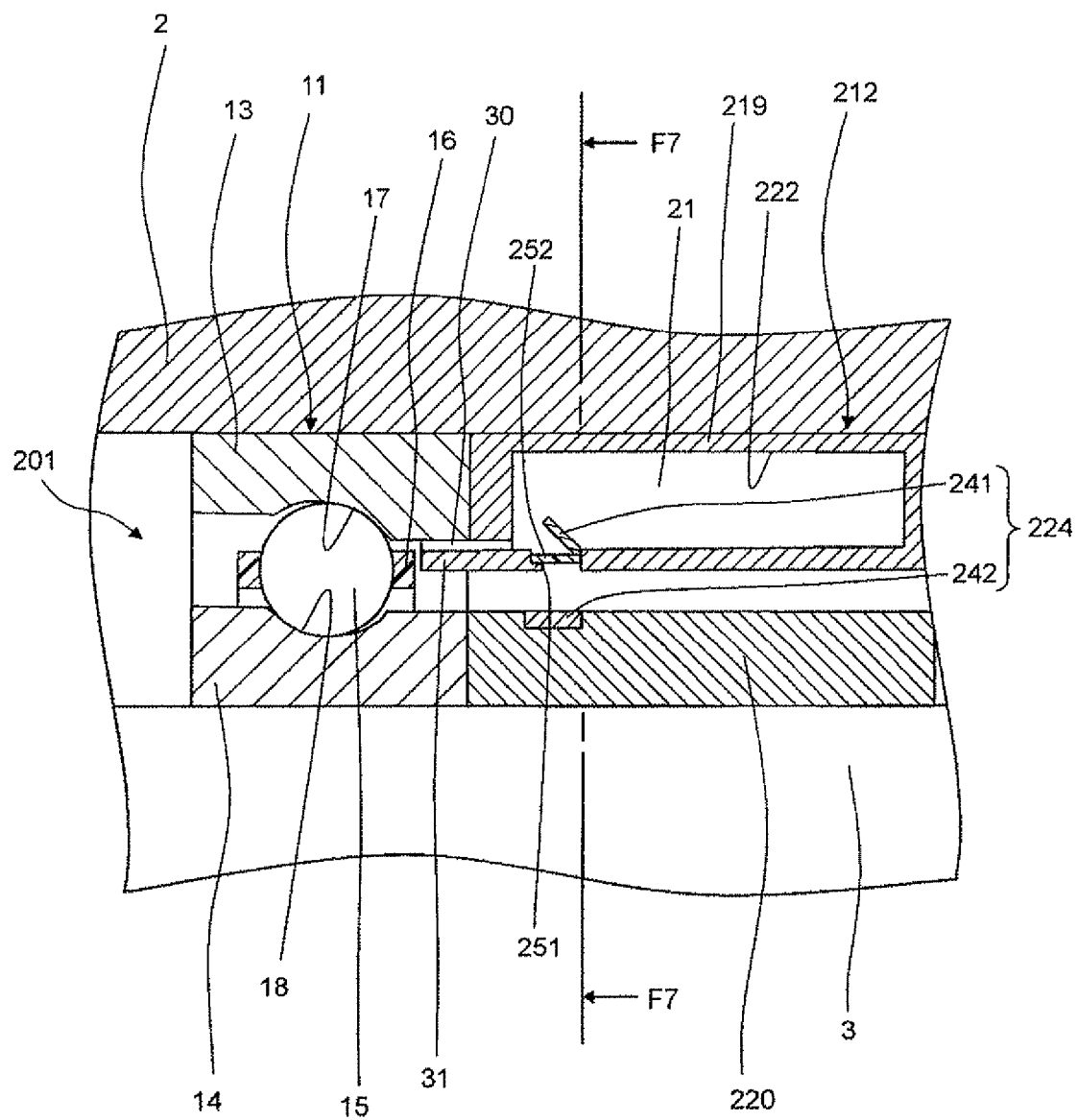
FIG. 6 is a schematic sectional view of a bearing device according to a third embodiment of the invention, taken along the axis.

Next, a third embodiment of the invention will be described. FIG. 6 is a schematic sectional view of a bearing device 201 according to the third embodiment of the invention, the sectional view being taken along a plane that includes a rotation axis of the bearing device 201. In FIG. 6, the components the same as those of the first embodiment shown in FIG. 1 are denoted by the same reference numerals as those of the corresponding components of the first embodiment shown in FIG. 1.

The bearing device 201 includes a liquid lubricant supply device 212. The liquid lubricant supply device 212 supplies oil content of grease 21 into a single row angular contact ball bearing 11.

The liquid lubricant supply device 212 includes an annular outer spacer 219, a liquid lubricant passage 30 and a vibrating device 224. The outer spacer 219 is fitted into the inner circumferential surface of a housing 2 of the machine tool. The liquid lubricant passage 30 provides fluid communication between the inner circumferential surface of an outer ring 13 and the outer circumferential surface of an inner ring 14. The vibration device 224 is used to supply oil content of the grease 21 to the space between the inner circumferential surface of the outer ring 13 and the outer circumferential surface of the inner ring 14. An annular inner spacer 220 is arranged on a radially inner side of the liquid lubricant supply device 212. The inner spacer 220 is fitted onto the outer circumferential surface of a main shaft 3 of the machine tool.

The outer spacer 219 has a grease storage portion 222 that stores the grease 21. The space inside the grease storage portion 222 communicates with the space between the inner circumferential surface of the outer ring 13 and the outer circumferential surface of the inner ring 14 via the liquid lubricant passage 30. In addition, a portion of the outer spacer 219 near the liquid lubricant passage 30 has a stepped through hole 251. A resin (for example, plastic) closing member 252 is attached to the stepped through hole 251 to thereby prevent the grease 21 from leaking through the stepped through hole 251. Note that the grease storage portion 222 is an example of a non-liquid lubricant storage portion.

The vibrating device 224 is formed of a metal reed valve 241 and a magnet portion 242. The magnet portion 242 is used to vibrate the reed valve 241.

Figure 7:
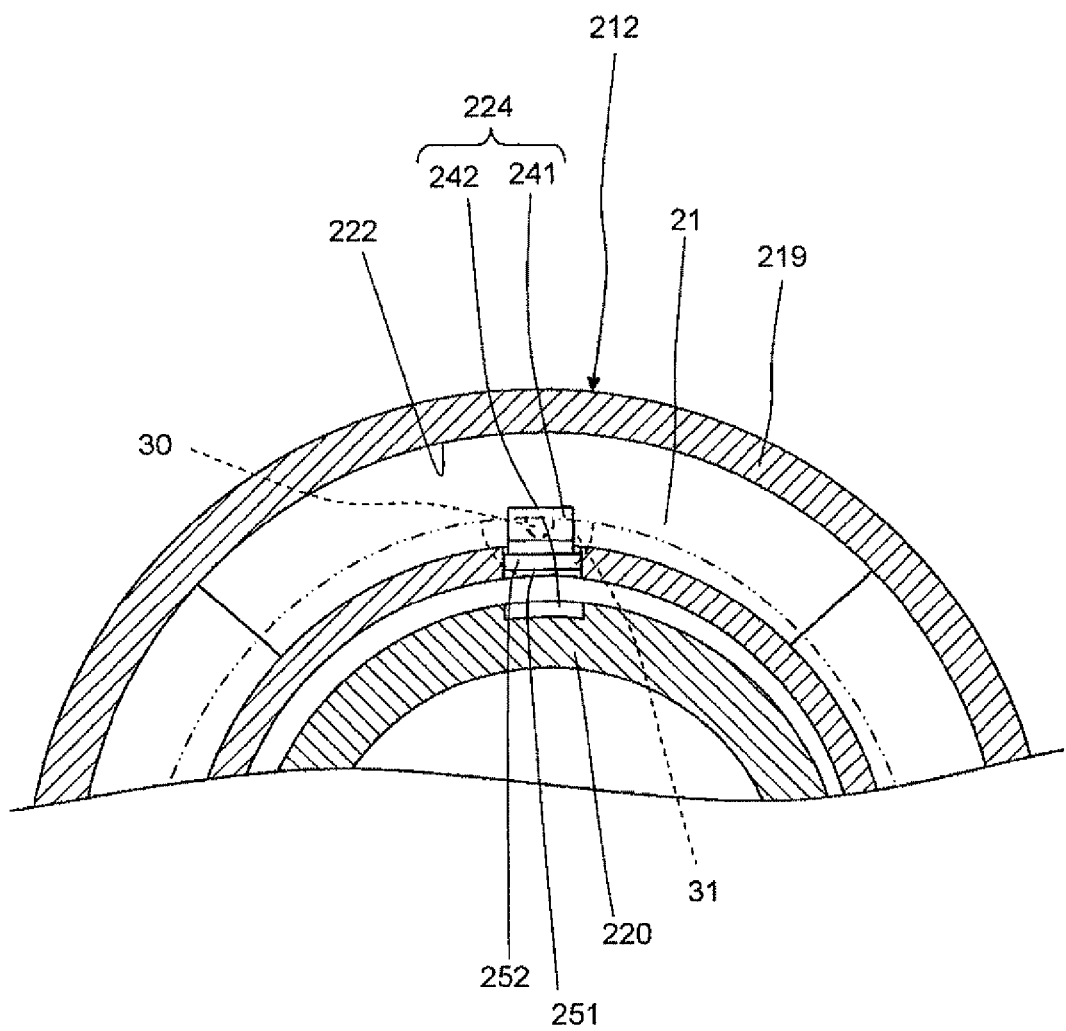
FIG. 7 is a sectional view on arrow F7-F7 in FIG. 6.

FIG. 7 is a sectional view taken along the line F7-F7 in FIG. 6. Note that, in FIG. 7, the chain double-dashed line indicates the position of the inner circumferential surface of a shoulder of the outer ring 13, and the dotted line indicates the shape of the protruding portion 31.

As shown in FIG. 6 and FIG. 7, the space inside the grease storage portion 222 is formed in a substantially rectangular shape in cross section taken along the axis of the outer ring 13, and is formed in a substantially circular arc shape in cross section taken perpendicularly to the axis of the outer ring 13. As in the case of the first and second embodiments, part of the liquid lubricant passage 30 is formed of the protruding portion 31 and the shoulder of the outer ring 13, and the remaining portion is formed at an outer ring 13—side end of the outer spacer 219.

The reed valve 241 is arranged in the liquid lubricant passage 30 so as to be inclined with respect to the closing member 252. One end of the reed valve 241 is fixed to the outer spacer 219, and the other end of the reed valve 241 is a free end (see FIG. 6).

The magnet portion 242 is formed so that part of the outer circumferential surface portion of the inner spacer 220 is magnetized. In addition, the magnet portion 242 is formed so as to overlap with the reed valve 241 and the closing member 252 in the radial direction.

With the above configured bearing device 201, when the magnet portion 242 faces the closing member 252, the other end (free end) of the reed valve 241 receives the magnetic force of the magnet portion 242 via the closing member 252 to move toward a radially inner side. When the magnet portion 242 is brought into a state, in which the magnet portion 242 does not face the closing member 252, the other end of the reed valve 241 moves toward a radially outer side by its elasticity. Thus, as the inner spacer 220 rotates integrally with the main shaft 3, the magnet portion 242 is repeatedly switched between the state, in which the magnet portion 242 faces the closing member 252, and the state, in which the magnet portion 242 does not face the closing member 252, so that the other end of the reed valve 241 vibrates. As a result, the vibrations of the other end of the reed valve 241 are applied to the grease 21 to separate base oil from the grease 21. The base oil passes through the liquid lubricant passage 30, enters between the inner circumferential surface of the outer ring 13 and the outer circumferential surface of the inner ring 14, and then adheres to a portion of the outer ring raceway groove 17 on the side closer to the outer spacer 219. By so doing, the outer ring raceway groove 17, the inner ring raceway groove 18, and the balls 15 are lubricated by the base oil.

In this way, because compressed air is not used to transfer the base oil, oil does not splash unlike the configuration described in JP-A-2002-130303, so that it is possible to prevent deterioration of an environment in which the machine tool is used.

In addition, the outer ring raceway groove 17, the inner ring raceway groove 18, and the balls 15 are lubricated by base oil, so that the agitation resistance is reduced, the service life is extended, and a maintenance-free property is achieved.

In addition, separation of base oil from the grease 21 is facilitated by the vibrations of the other end of the reed valve 241, so that the amount of base oil that enters between the inner circumferential surface of the outer ring 13 and the outer circumferential surface of the inner ring 14 is increased to thereby make it possible to carry out lubrication that is equivalent in performance to oil lubrication.

In addition, because the outer spacer 219 has the grease storage portion 222 that stores the grease 21, the number of times the grease 21 is refilled is reduced, so that it is possible to further improve maintainability.

In addition, because the end of the liquid lubricant passage 30 on the side closer to the angular contact ball bearing 11 is located near the outer ring raceway groove 17, the inner ring raceway groove 18, and the balls 15, it is possible to efficiently supply base oil to the outer ring raceway groove 17, the inner ring raceway groove 18, and the balls 15.

In addition, the reed valve 241 is arranged inside the grease storage portion 222, and part of the outer circumferential surface portion of the inner spacer 220 is magnetized to form the magnet portion 242, so that it is possible to reduce the size of the liquid lubricant supply device 212.

In addition, the vibrating device 224 is formed of the reed valve 241 and the magnet portion 242, so that the grease 21 is vibrated to make it possible to separate base oil from the grease 21 without supply of electric power unlike the first and second embodiments.

In addition, the vibrating device 224 is formed of the reed valve 241 and the magnet portion 242, so that the vibrating device 224 is hard to fail, and maintenance is easy.

In the third embodiment, the bearing device 201 includes the single row angular contact ball bearing 11; instead, the bearing device 201 may include a double row angular contact ball bearing or may include, for example, a cylindrical roller bearing, a conical roller bearing, or the like, other than the angular contact ball bearing.

In the third embodiment, the grease 21 is used; however, other than the grease 21, a non-liquid lubricant that is a solid, semisolid or viscous lubricant or a lubricant-containing resin composition may also be used. The lubricant-containing resin composition may be one obtained by adding oil to polyethylene (PE) for solidification, for example.

In the third embodiment, the inner spacer 220 having the single magnet portion 242 at the outer circumferential surface portion is used; instead, an inner spacer having a plurality of magnet portions at the outer circumferential surface portion may be used.

In the third embodiment, the magnet portion 242 is formed so that part of the outer circumferential surface portion of the inner spacer 220 is magnetized; instead, the magnet portion 242 may be a magnet that is fitted in a recess provided on the outer circumferential surface of the inner spacer.

In the third embodiment, the space inside the grease storage portion 222 is formed in a substantially circular arc shape in cross section taken perpendicularly to the axis of the outer ring 13; instead, the space inside the grease storage portion 222 may be formed in an annular shape in cross section taken perpendicularly to the axis of the outer ring 13.

In the third embodiment, the outer spacer 219 has the single grease storage portion 222; instead, the outer spacer 219 may have a plurality of the grease storage portions 222 that are formed at predetermined intervals in the circumferential direction. That is, in an embodiment of the invention, the number of non-liquid lubricant storage portions may be either one or multiple.

In the third embodiment, the space inside the single grease storage portion 222 communicates with the space between the inner circumferential surface of the outer ring 13 and the outer circumferential surface of the inner ring 14 via the single liquid lubricant passage 30; instead, the space inside the single grease storage portion 222 may communicate with the space between the inner circumferential surface of the outer ring 13 and the outer circumferential surface of the inner ring 14 via a plurality of the liquid lubricant passages 30. That is, in an embodiment of the invention, the number of liquid lubricant passages that connect with the single non-liquid lubricant storage portion may be either one or multiple.

In addition, the bearing device according to an embodiment of the invention may be used for a machine other than a machine tool, and, particularly, may be desirably used for a machine that has a shaft that rotates at a high speed.

As described above, a bearing device according to an embodiment of the invention includes: an outer ring that has a raceway surface on the inner circumferential surface of the outer ring; an inner ring that has a raceway surface on the outer circumferential surface of the inner ring; a plurality of rolling elements that are arranged between the raceway surface of the outer ring and the raceway surface of the inner ring; a retainer that retains the plurality of rolling elements; and a liquid lubricant supply device that supplies a liquid lubricant to the space between the inner circumferential surface of the outer ring and the outer circumferential surface of the inner ring, wherein the liquid lubricant supply device includes a liquid lubricant passage that provides fluid communication between the inner circumferential surface of the outer ring and the outer circumferential surface of the inner ring and a vibrating device that contacts a non-liquid lubricant that is a solid, semisolid, or viscous lubricant or a lubricant-containing resin composition to vibrate the non-liquid lubricant in order to supply the liquid lubricant to the space between the inner circumferential surface of the outer ring and the outer circumferential surface of the inner ring via the liquid lubricant passage.

With the above configuration, when the vibrating device vibrates a non-liquid lubricant that is a solid, semisolid, or viscous lubricant or a lubricant-containing resin composition, oil content is separated from the non-liquid lubricant. The oil content passes through the liquid lubricant passage and enters between the inner circumferential surface of the outer ring and the outer circumferential surface of the inner ring. By so doing, the raceway surface of the outer ring, the raceway surface of the inner ring, and the rolling elements are lubricated by oil content.

In this way, the oil content is not transferred by compressed air, so that oil content does not splash. Therefore, it is possible to reduce a load on a usage environment.

In addition, the raceway surface of the outer ring, the raceway surface of the inner ring, and the rolling elements are lubricated by oil content, so that the agitation resistance is reduced, the service life is extended, and a maintenance-free property is achieved.

In addition, separation of oil content from the non-liquid lubricant is facilitated by the vibrations of the vibrating device, so that the amount of oil content that enters between the inner circumferential surface of the outer ring and the outer circumferential surface of the inner ring is increased to thereby make it possible to carry out lubrication that is equivalent in performance to oil lubrication.

In the embodiment of the invention, the liquid lubricant supply device has a non-liquid lubricant storage portion that stores the non-liquid lubricant, and the vibrating device is arranged inside the non-liquid lubricant storage portion.

According to the embodiment, because the non-liquid lubricant storage portion that stores the non-liquid lubricant is provided, the number of times the non-liquid lubricant is refilled is reduced, so that it is possible to further improve maintainability.

In addition, the vibrating device is arranged inside the non-liquid lubricant storage portion, so that it is possible to reduce the size of the device.

In the embodiment of the invention, the bearing device may further include: a temperature sensor that detects a temperature of at least one of the outer ring and the inner ring; and a control device that controls the vibrating device based on the temperature detected by the temperature sensor, wherein the control device controls the vibrating device so that a vibration duration, frequency, or amplitude of the vibrating device when the temperature detected by the temperature sensor is a first temperature differs from a vibration duration, frequency, or amplitude of the vibrating device when the temperature detected by the temperature sensor is a second temperature that differs from the first temperature.

According to the embodiment, the control device controls the vibrating device so that a vibration duration, frequency, or amplitude of the vibrating device when the temperature detected by the temperature sensor is a first temperature differs from a vibration duration, frequency, or amplitude of the vibrating device when the temperature detected by the temperature sensor is a second temperature that differs from the first temperature, so that it is possible to adjust the amount of oil content that enters between the inner circumferential surface of the outer ring and the outer circumferential surface of the inner ring according to the temperature detected by the temperature sensor.

Alternatively, in the embodiment of the invention, the bearing device may further include: a rotation speed sensor that detects a rotation speed of the outer ring or a rotation speed of the inner ring; and a control device that controls the vibrating device based on the rotation speed detected by the rotation speed sensor, wherein the control device may control the vibrating device so that a vibration duration, frequency, or amplitude of the vibrating device when the rotation speed detected by the rotation speed sensor is a first rotation speed differs from a vibration duration, frequency, or amplitude of the vibrating device when the rotation speed detected by the rotation speed sensor is a second rotation speed that differs from the first rotation speed.

According to the embodiment, the control device controls the vibrating device so that a vibration duration, frequency, or amplitude of the vibrating device when the rotation speed detected by the rotation speed sensor is a first rotation speed differs from a vibration duration, frequency, or amplitude of the vibrating device when the rotation speed detected by the rotation speed sensor is a second rotation speed that differs from the first rotation speed, so that it is possible to adjust the amount of oil content that enters between the inner circumferential surface of the outer ring and the outer circumferential surface of the inner ring according to the rotation speed detected by the rotation speed sensor.

The invention claimed is:

1. A bearing device comprising:
    an outer ring that has a raceway surface on an inner circumferential surface of the outer ring;
    an inner ring that has a raceway surface on an outer circumferential surface of the inner ring;
    a plurality of rolling elements that are arranged between the raceway surface of the outer ring and the raceway surface of the inner ring;
    a retainer that retains the plurality of rolling elements; and
    a liquid lubricant supply device that supplies an oil separated from a grease to a space between the inner circumferential surface of the outer ring and the outer circumferential surface of the inner ring, the liquid lubricant supply device including:
        a liquid lubricant passage that provides fluid communication between the inner circumferential surface of the outer ring and the outer circumferential surface of the inner ring;

an ultrasonic generator or ultrasonic vibrator that contacts a non-liquid lubricant that is the grease to vibrate the grease in order to supply the oil separated from the grease to the space between the inner circumferential surface of the outer ring and the outer circumferential surface of the inner ring via the liquid lubricant passage; and a non-liquid lubricant storage portion that stores the non-liquid lubricant, wherein the bearing device further comprises:
   a temperature sensor that detects a temperature of at least one of the outer ring and the inner ring; and
   a control device that controls the ultrasonic generator or ultrasonic vibrator based on the temperature detected by the temperature sensor, the control device controls the ultrasonic generator or ultrasonic vibrator so that a vibration duration, frequency, or amplitude of the ultrasonic generator or ultrasonic vibrator when the temperature detected by the temperature sensor is a first temperature differs from a vibration duration, frequency, or amplitude of the ultrasonic generator or ultrasonic vibrator when the temperature detected by the temperature sensor is a second temperature, the second temperature being different from the first temperature, the ultrasonic generator or ultrasonic vibrator is arranged inside the non-liquid lubricant storage portion.

* * * * *